(12) United States Patent
Koga

(10) Patent No.: US 10,131,080 B2
(45) Date of Patent: Nov. 20, 2018

(54) MOLDING METHOD OF LIQUID ELASTOMER

(71) Applicant: NOK CORPORATION, Tokyo (JP)

(72) Inventor: Shotaro Koga, Fujisawa (JP)

(73) Assignee: NOK Corporation (JP)

( * ) Notice: Subject to any disclaimer, the term of this patent is extended or adjusted under 35 U.S.C. 154(b) by 401 days.

(21) Appl. No.: 14/778,008

(22) PCT Filed: Mar. 20, 2014

(86) PCT No.: PCT/JP2014/057653
§ 371 (c)(1),
(2) Date: Sep. 17, 2015

(87) PCT Pub. No.: WO2014/156916
PCT Pub. Date: Oct. 2, 2014

(65) Prior Publication Data
US 2016/0288391 A1 Oct. 6, 2016

(30) Foreign Application Priority Data

Mar. 29, 2013 (JP) .................................. 2013-072084

(51) Int. Cl.
*B29C 45/32* (2006.01)
*B29C 45/14* (2006.01)
(Continued)

(52) U.S. Cl.
CPC ........ *B29C 45/322* (2013.01); *B29C 33/0066* (2013.01); *B29C 33/0088* (2013.01);
(Continued)

(58) Field of Classification Search
CPC .................................................. B29C 45/322
See application file for complete search history.

(56) References Cited

U.S. PATENT DOCUMENTS

| 4,133,855 A | 1/1979 | Pahl |
| 7,338,626 B1 | 3/2008 | Groth |
(Continued)

FOREIGN PATENT DOCUMENTS

| CN | 101456239 A | 6/2009 |
| CN | 101468512 A | 7/2009 |
| EP | 2415582 A1 | 2/2012 |
| JP | S54-67767 U | 5/1979 |
| JP | 60-244514 A | 12/1985 |
| JP | S61-40129 A | 2/1986 |
| JP | 63-122509 A | 5/1988 |
(Continued)

OTHER PUBLICATIONS

Extended European Search Report for EP Application No. 14774857.8, dated Apr. 12, 2016 (6 pages).

*Primary Examiner* — Larry W Thrower
(74) *Attorney, Agent, or Firm* — Harness, Dickey & Pierce, P.L.C.

(57) ABSTRACT

A molding method of a liquid elastomer can reduce an amount of disposal of a molding material, and can prevent a metal mold from being enlarged in size on a plane when a plurality of molded articles are simultaneously molded by using the metal mold, thereby achieving a good manufacturing efficiency. The molding method of the liquid elastomer molds a molded article constructed by a liquid elastomer by using a metal mold, the metal mold is a metal mold for an injection molding, a plurality of product cavity spaces are provided side by side in a mold clamping and mold opening direction of the metal mold, and a plurality of molded articles are simultaneously molded by using the metal mold. The metal mold has a sprue, runners and gates which are communicated with a plurality of product cavity spaces. The runners have orthogonal runner portions and parallel runner portions.

17 Claims, 8 Drawing Sheets

(51) Int. Cl.
  *B29C 33/00* (2006.01)
  *H01M 8/0284* (2016.01)
  *H01M 8/0286* (2016.01)
  *B29K 21/00* (2006.01)
  *B29L 31/26* (2006.01)
  *B29L 31/34* (2006.01)
  *B29C 45/27* (2006.01)

(52) U.S. Cl.
  CPC ........ *B29C 45/14336* (2013.01); *B29C 45/32* (2013.01); *H01M 8/0284* (2013.01); *H01M 8/0286* (2013.01); *B29C 2045/2712* (2013.01); *B29K 2021/006* (2013.01); *B29L 2031/265* (2013.01); *B29L 2031/3468* (2013.01); *Y02P 70/56* (2015.11)

(56) References Cited

U.S. PATENT DOCUMENTS

| | | |
|---|---|---|
| 2008/0124458 A1 | 5/2008 | Okabe |
| 2008/0230950 A1 | 9/2008 | Nishimura et al. |

FOREIGN PATENT DOCUMENTS

| | | |
|---|---|---|
| JP | 01-501782 A | 6/1989 |
| JP | 2000-202860 A | 7/2000 |
| JP | 2006-026923 A | 2/2006 |
| JP | 2006-107798 A | 4/2006 |
| JP | 2008-235489 A | 10/2008 |
| JP | 2010-505664 A | 2/2010 |
| JP | 2010-234646 A | 10/2010 |
| JP | 2011-187604 A | 9/2011 |
| WO | WO-88-04985 A1 | 7/1988 |

MOLDING METHOD OF LIQUID ELASTOMER

CROSS-REFERENCE TO RELATED APPLICATIONS

This application is a U.S. National Phase Application under 35 U.S.C. 371 of International Application No. PCT/JP2014/057653, filed on Mar. 20, 2014 and published in Japanese as WO 2014/156916 A1 on Oct. 2, 2014. This application claims priority to Japanese Patent Application No. 2013-072084, filed on Mar. 29, 2013. The entire disclosures of the above applications are incorporated herein by reference.

BACKGROUND OF THE INVENTION

Field of the Invention

The present invention relates to a molding method of a liquid elastomer, and more particularly to a method of molding a molded article constructed by a liquid elastomer by using a metal mold. The molded article constructed by the liquid elastomer is, for example, a gasket for a fuel battery or the other general gasket or a packing.

Description of the Conventional Art

For future popularization of the fuel battery, downsizing and cost reduction of a separator and a gasket are necessary. With regard to the gasket, it is possible to reduce an amount of disposal of a molding material (a liquid elastomer) by employing an injection molding, however, in the case that a plurality of gaskets are simultaneously molded by using the metal mold, the metal mold is enlarged in size by arranging a plurality of product cavity spaces on the same plane of the metal mold (in a direction which is orthogonal to a mold clamping and mold opening direction of the metal mold). As a result, a manufacturing efficiency is not good.

A technique of simultaneously molding a plurality of molded articles by using a metal mold is described in Japanese Unexamined Patent Publication No. 2006-026923, however, the prior art is not provided for an injection molding, but a molding machine for a compression molding.

SUMMARY OF THE INVENTION

Problem to be Solved by the Invention

The present invention is made by taking the above point into consideration, and an object of the present invention is to provide a molding method of a liquid elastomer which can reduce an amount of disposal of a molding material, and can prevent a metal mold from being enlarged in size on a plane when a plurality of molded articles are simultaneously molded by using the metal mold, thereby achieving a good manufacturing efficiency.

Means for Solving the Problem

In order to achieve the object mentioned above, a molding method of a liquid elastomer according to a first aspect of the present invention is a method of molding a molded article constructed by a liquid elastomer by using a metal mold, wherein the metal mold is a metal mold for an injection molding, a plurality of product cavity spaces are provided side by side in a mold clamping and mold opening direction of the metal mold, and a plurality of molded articles are simultaneously molded by using the metal mold.

Further, a molding method of a liquid elastomer according to a second aspect of the present invention is the molding method described in the first aspect mentioned above, wherein the metal mold is provided with a sprue, runners and gates which are communicated with a plurality of product cavity spaces, the runners are provided with orthogonal runner portions extended in a direction which is orthogonal to the molding clamping and mold opening direction of the metal from the sprue, and parallel runner portions extended in a direction which is parallel to the mold clamping and mold opening direction of the metal mold from the orthogonal runner portions, and the parallel runner portions are arranged in an outer peripheral side of a plurality of product cavity spaces.

Further, a molding method of a liquid elastomer according to a third aspect of the present invention is the molding method described in the second aspect mentioned above, wherein a split mold defining the orthogonal runner portions in the metal mold is set to a cold runner mold.

Further, a molding method of a liquid elastomer according to a fourth aspect of the present invention is the molding method described in the second or third aspect mentioned above, wherein the metal mold is structured such as to mold the molded article in a state in which an insert part is set, and the molded article is integrally molded in relation to the insert part.

Further, a molding method of a liquid elastomer according to a fifth aspect of the present invention is the molding method described in the second, third or fourth aspect mentioned above, wherein the parallel runner portion is structured such that an opening cross sectional area thereof is reduced little by little from an upstream side of a molding material flow toward a downstream side, over the entire length thereof or every split molds defining a plurality of product cavity spaces.

Further, a molding method of a liquid elastomer according to a sixth aspect is the molding method described in the first, second, third, fourth or fifth aspect mentioned above, wherein the molded article is a gasket for a fuel battery.

In the molding method according to the present invention having the structure mentioned above, the injection molding by the metal mold is executed when the molded article constructed by the liquid elastomer is molded by using the metal mold. As a result, it is possible to reduce an amount of disposal of the molding material. Further, since a plurality of product cavity spaces are provided side by side in the mold clamping and mold opening direction, that is, in the laminating direction of a plurality of split molds in the structure of the metal mold, the metal mold is not enlarged in size on a plane. As a result, it is possible to improve a manufacturing efficiency, for example, an installation area of the metal mold can be made small. In the case that the molded articles are, for example, gaskets for a fuel battery, most of the gaskets are formed into a rectangular frame-like plane. As a result, the product cavity spaces for molding the gaskets are formed into a rectangular frame-like plane. Therefore, a plurality of product cavity spaces having the shapes mentioned above are provided side by side in the mold clamping and mold opening direction of the metal molds, that is, in the laminating direction of a plurality of split molds.

The metal mold for the injection molding is provided with the sprue, the runners and the gates communicating with the product cavity spaces, in addition to the product cavity spaces, however, in the case that the product cavity spaces are, for example, formed into the rectangular frame-like plane as mentioned above, the runners can employ an aspect that the runners are arranged in the inner peripheral side of the product cavity spaces, and an aspect that the runners are arranged in the outer peripheral side of the product cavity spaces, and both the aspects are included in the present invention.

In the former aspect that the runners are arranged in the inner peripheral side of the product cavity spaces, it is preferable to extend the parallel runner portions from the sprue toward the direction which is parallel to the mold clamping and mold opening direction of the metal mold, and extend the orthogonal runner portions from the parallel runner portions toward the respective product cavity spaces in the direction which is orthogonal to the mold clamping and mold opening direction of the metal mold. The structure mentioned above of the metal mold is suitable for a hot runner type metal mold, on the presupposition that the molding material is thermosetting.

On the other hand, in the latter aspect that the runners are arranged in the outer peripheral side of the product cavity spaces, it is preferable to extend the orthogonal runner portions from the spur toward the direction which is orthogonal to the mold clamping and mold opening direction of the metal mold and extend the parallel runner portions from the orthogonal runner portions toward the direction which is parallel to the mold clamping and mold opening direction of the metal mold. The structure mentioned above of the metal mold is suitable for a partial cold runner type metal mold on the presupposition that the molding material is thermosetting. More specifically, the molding material within the orthogonal runner portion can be provided for the next molding without being thermally cured, by setting the split mold defining the orthogonal runner portions in the metal mold to the cold runner mold. As a result, it is possible to further efficiently promote the reduction of the amount of disposal of the molding material.

Further, in the case of the latter aspect, the sprue and the parallel runner portions are not arranged in a penetrating manner in the inner peripheral side of the product cavity spaces. Accordingly, it is possible to execute the insert molding, that is, it is possible to execute the insert molding while using the plate-like part, for example, the separator for the fuel battery as the insert part. In the case that the insert part is the separator for the fuel battery, the molded article is the gasket for the fuel battery, and the product in which the gasket for the fuel battery is integrally molded with the separator for the fuel battery is produced.

In relation to the parallel runner portion extended toward the direction which is parallel to the mold clamping and mold opening direction of the metal mold, an opening cross sectional area may be fixed over the entire length of the parallel runner portion, however, in the case that the opening cross sectional area is fixed, for example, if the parallel runner portion is formed into a straight cylindrical shape over the entire length thereof, it may be hard to mold release the material (the burr) thermally cured in the parallel runner portion after the molding, or it may be hard to open and close the split molds. In order to devise a countermeasure, it is preferable to employ a structure in which the opening cross sectional area of the parallel runner portion is reduced little by little from an upstream side of the molding material flow toward a downstream side. According to the structure, since a taper is set in an inner peripheral surface of the parallel runner portion and an outer peripheral surface of the burr, it is easy to mold release the burr, or it is easy to open and close the split molds. As an aspect of the structure for reducing the opening cross sectional area, there can be an aspect that the opening cross sectional area of the parallel runner portion is reduced little by little from the upstream side of the molding material flow toward the downstream side over the entire length of the parallel runner portion, and an aspect that the opening cross sectional area of the parallel runner portion is reduced little by little from the upstream side of the molding material flow toward the downstream side every split molds defining a plurality of product cavity spaces, and both the aspects are included in the present invention.

Effect of the Invention

The present invention can achieve the following effects.

More specifically, according to the present invention, the injection molding by the metal mold is executed when the molded article constructed by the liquid elastomer is molded by using the metal mold, as described above. As a result, it is possible to reduce the amount of disposal of the molding material. Further, since a plurality of product cavity spaces are provided side by side in the mold clamping and mold opening direction, that is, in the laminating direction of a plurality of split molds in the structure of the metal mold, the metal mold is not enlarged in size on the plane. As a result, it is possible to improve the manufacturing efficiency, for example, the installation area of the metal mold can be made small. With regard to the structure of the metal mold, it is possible to provided the aspect that the runners are arranged in the inner peripheral side of the product cavity spaces, and the aspect that the runners are arranged in the outer peripheral side. In the case of the latter aspect, it is possible to set the metal mold to the cold runner and execute the insert molding. Further, it is possible to easily mold release the burr or easily open and close the split molds, by employing the structure in which the opening cross sectional area of the parallel runner portion is reduced little by little from the upstream side of the molding material flow toward the downstream side. The molded article is, for example, the gasket for the fuel battery. Therefore, the operations and effects mentioned above can be obtained, in the technical field for molding the gasket for the fuel battery.

DETAILED DESCRIPTION OF PREFERRED EMBODIMENTS

Next, a description will be given of embodiments according to the present invention with reference to the accompanying drawings.

First Embodiment

Figure 1:
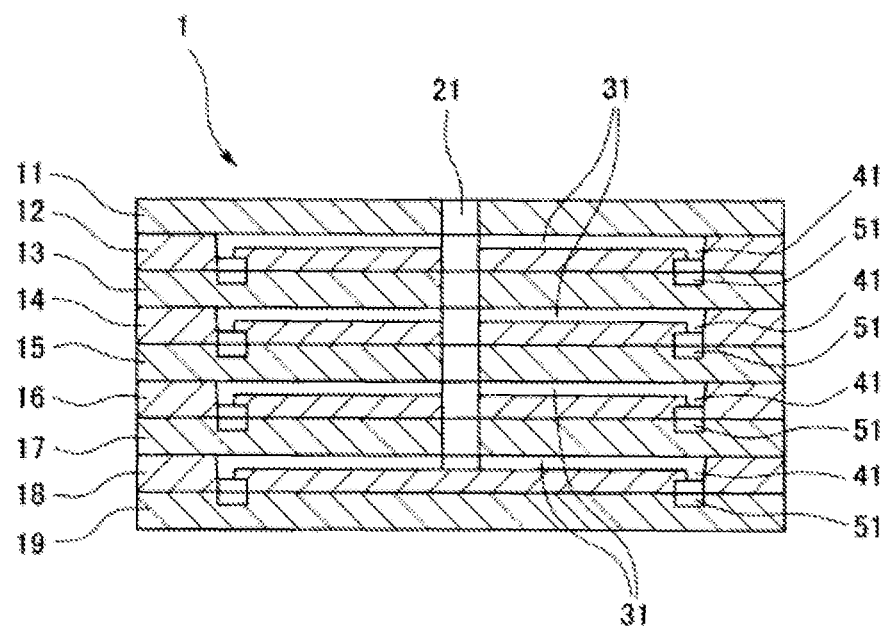
FIG. 1 is a cross sectional view showing a mold clamping state of a metal mold which is used for execution of a molding method according to a first embodiment of the present invention.
Figure 2:
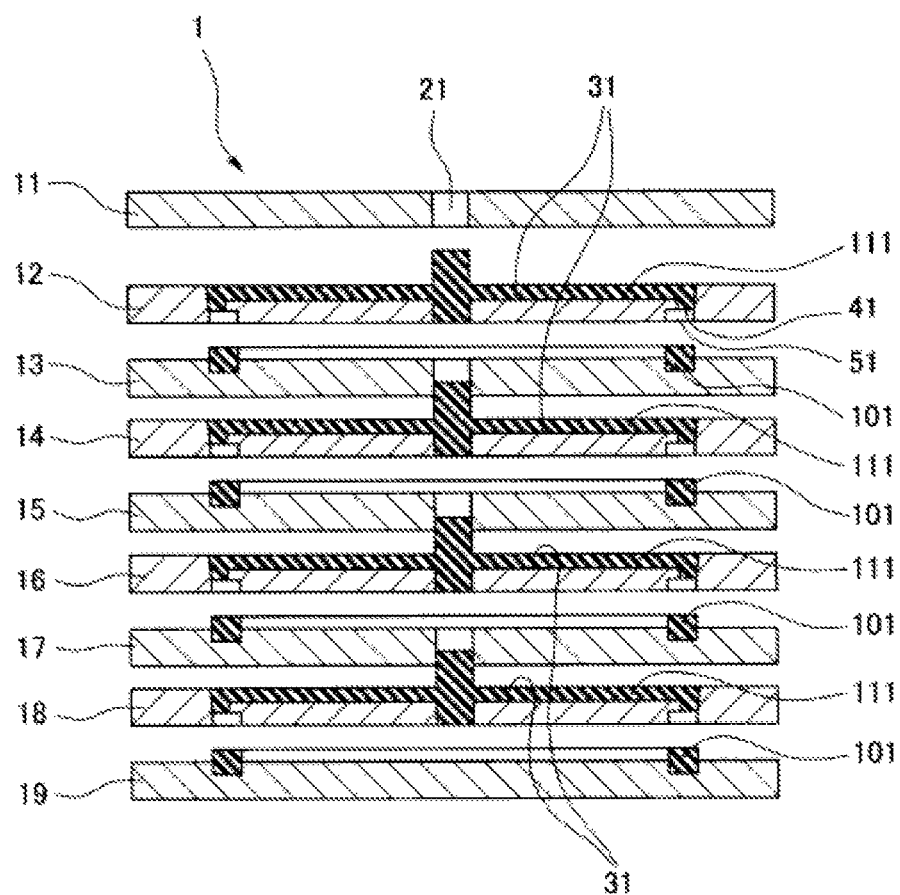
FIG. 2 is a cross sectional view showing a mold opening state of the metal mold.

FIGS. 1 and 2 show a cross section of a metal mold 1 which is used for execution of a molding method according to a first embodiment of the present invention. The metal mold 1 is a metal mold for an injection molding, and is structured such that a plurality of (four in the embodiment) product cavity spaces 51 having the same shape and same size are provided side by side at predetermined intervals in a mold clamping and mold opening direction (a vertical direction in the drawing) of the metal mold 1, and a plurality of (four in the embodiment) molded articles 101 having the same shape and same size can be simultaneously molded by using the metal mold 1. Further, the metal mold 1 is provided with first to ninth split molds 11 to 19 which are laminated and arranged in the mold clamping and mold opening direction of the metal mold 1, and product cavity spaces 51 are provided respectively in parting portions of the second mold 12 and the third mold 13, parting portions of the fourth mold 14 and the fifth mold 15, parting portions of the sixth mold 16 and the seventh mold 17 and parting portions of the eighth mold 18 and the ninth mold 19, except the first mold 11 provided with a sprue opening portion among nine split molds 11 to 19. Since the metal mold 1 is supposed to take out a plurality of gaskets for fuel battery which are constructed by a liquid rubber formed into a rectangular frame-like (lattice-like) plane, each of a plurality of product cavity spaces 51 is formed into a rectangular frame-like plane.

Further, the metal mold 1 is provided with a sprue 21, runners 31 and gates 41 which are communicated with a plurality of product cavity spaces 51.

The sprue 21 is open so as to touch with nozzle at the center of a plane of the first mold 11, and is provided so as to pass through from here to the eighth mold 18 having the product cavity space 51 at the lowest stage toward one side (a lower side in the drawing) of the mold clamping and mold opening direction of the metal mold 1. Therefore, the sprue 21 is provided in an inner peripheral side of a plurality of product cavity spaces 51 from the product space 51 at the highest stage to the product cavity space 51 at the lowest stage.

The runners 31 are provided in a direction (a lateral direction in the drawing) which is orthogonal to the mold clamping and mold opening direction of the metal mold 1 from the sprue 21 toward each of the product cavity spaces 51, and are communicated with the product cavity spaces 51 via gates 41 provided in leading ends of the runners. As mentioned above, since the product cavity spaces 51 are formed into the rectangular frame-like plane, and the sprue 21 is arranged at the center of the plane of the metal mold 1, the runners 31 are provided radially from the sprue 21. For example, four runners 31 are radially provided toward four corners of the product cavity spaces 51 (four corners of the rectangular plane), and the runners 31 are communicated respectively with the product cavity spaces 51 via the gates 41. Therefore, according to the structure, four runners 31 and the gates 41 at four positions are provided in one product cavity space 51. Further, the runners 31 are provided in upper surfaces of the second mold 12, the fourth mold 14, the sixth mold 16 and the eighth mold 18 which are provided with the product cavity spaces 51 in their lower surfaces.

In the case that a plurality of molded articles are simultaneously molded by using the metal mold 1 having the structure mentioned above and the molds are opened, the molded articles 101 are retained by the upper surfaces of the third mold 13, the fifth mold 15, the seventh mold 17 and the ninth mold 19, and the burrs 111 constructed by the sprue portion, the runner portions and the gate portions are retained in the second mold 12, the fourth mold 14, the sixth mold 16 and the eighth mold 18, as shown in FIG. 2.

Second Embodiment

Figure 3:
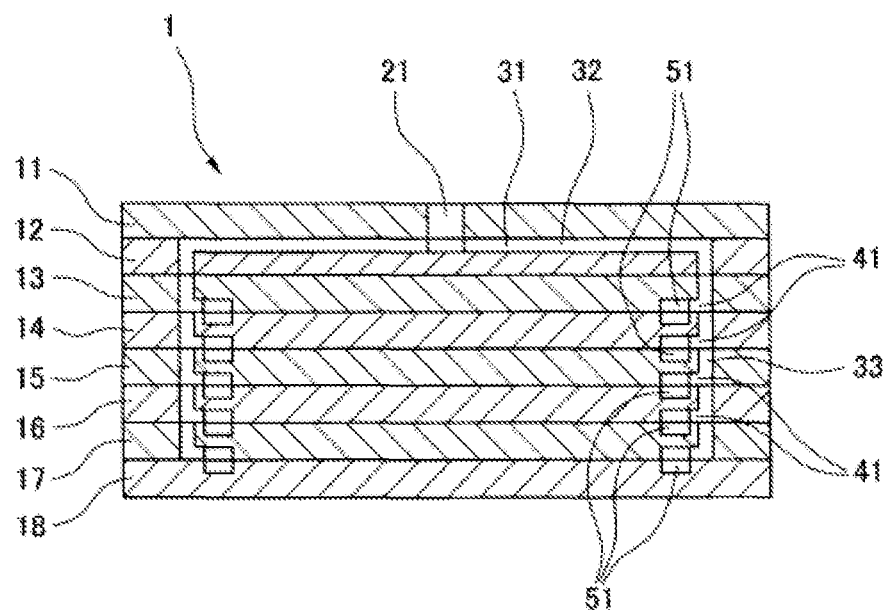
FIG. 3 is a cross sectional view showing a mold clamping state of a metal mold which is used for execution of a molding method according to a second embodiment of the present invention.
Figure 4:
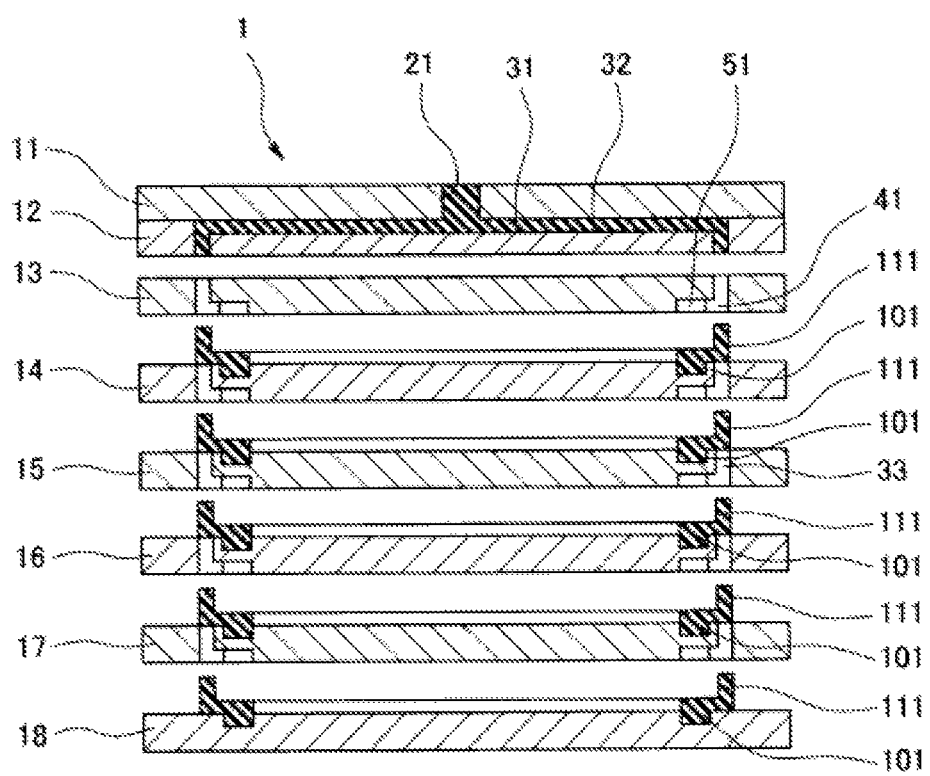
FIG. 4 is a cross sectional view showing a mold opening state of the metal mold.

FIGS. 3 and 4 show a cross section of a metal mold 1 which is used for execution of a molding method according to a second embodiment of the present invention. The metal mold 1 is a metal mold for an injection molding, and is structured such that a plurality of (five in the embodiment) product cavity spaces 51 having the same shape and same size are provided side by side at predetermined intervals in a mold clamping and mold opening direction (a vertical direction in the drawing) of the metal mold 1, and a plurality of (five in the embodiment) molded articles 101 having the same shape and same size can be simultaneously molded by using the metal mold 1. Further, the metal mold 1 is provided with first to eighth split molds 11 to 18 which are laminated and arranged in the mold clamping and mold opening direction of the metal mold 1, and product cavity spaces 51 are provided respectively in parting portions of the third mold 13 and the fourth mold 14, parting portions of the fourth mold 14 and the fifth mold 15, parting portions of the fifth mold 15 and the sixth mold 16, parting portions of the sixth mold 16 and the seventh mold 17 and parting portions of the seventh mold 17 and the eighth mold 18, except the first mold 11 and the second mold 12 which are provided with a sprue 21 and an orthogonal runner portion 32 among eight split molds 11 to 18. Since the metal mold 1 is supposed to take out a plurality of gaskets for fuel battery which are constructed by a liquid rubber formed into a rectangular frame-like plane, each of a plurality of product cavity spaces 51 is formed into a rectangular frame-like plane.

Further, the metal mold 1 is provided with a sprue 21, a runner 31 and gates 41 which are communicated with a plurality of product cavity spaces 51.

The sprue 21 is open so as to touch with nozzle at the center of a plane of the first mold 11, and is provided from here to the second mold 12 just below the sprue toward one direction (a lower direction in the drawing) of the mold clamping and mold opening direction of the metal mold 1.

The runner 31 is provided with an orthogonal runner portion 32 extended toward a direction (a lateral direction in the drawing) which is orthogonal to the mold clamping and mold opening direction of the metal mold 1 from the sprue 21, and a parallel runner portion 33 extended toward one side in a direction which is parallel to the mold clamping and mold opening direction of the metal mold 1 from a leading end of the orthogonal runner portion 32. The orthogonal runner portion 32 is provided in an upper surface of the second mold 12 having the sprue 21. The parallel runner portion 33 is arranged in an outer peripheral side of a plurality of product cavity spaces 51, is provided so as to pass through from the leading end of the orthogonal runner portion 32 to the seventh mold 17 having the product cavity space 51 at the lowest stage toward one side in the direction which is parallel to the mold clamping and mold opening direction of the metal mold 1, and is communicated with each of the product cavity spaces 51 via the gate 41 provided in each of the third to seventh molds 13 to 17. Since the product cavity space 51 is formed into the rectangular frame-like plane and the sprue 21 is arranged at the center of the plane of the metal mold 1 as mentioned above, and the parallel runner portion 33 is arranged in an outer peripheral side of the product cavity spaces 51, the orthogonal runner portion 32 is provided radially from the sprue 21. For example, four orthogonal runner portions 32 are provided radially toward four corners of the product cavity space 51 (four corners of the rectangular plane), and the parallel runner portion 33 is provided from each of leading ends thereof toward one side in the mold clamping and mold opening direction of the metal mold 1. As a result, according to the structure, four parallel runner portions 33 are provided in relation to five product cavity spaces 51, and the gates 41 at four positions are provided in one product cavity space 51. Further, the gate 41 is provided in a lower surface of each of the third to seventh molds 13 to 17 which are provided with the product cavity spaces 51 in their lower surfaces.

In the case that a plurality of molded articles 101 are simultaneously molded by using the metal mold 1 having the structure mentioned above and the molds are opened, the molded articles 101 are retained to the upper surfaces of the fourth to eighth molds 14 to 18 in a state of having the burrs 111 constructed by the runner portions and the gate portions, as shown in FIG. 4.

The following structures can be added to the molding method and the metal mold 1 according to the second embodiment (complement).

More specifically, since the metal mold 1 is provided with the orthogonal runner portion 32 in the second mold 12 in which the product cavity space 51 is not provided, as shown in FIGS. 3 and 4, the molding material within the orthogonal runner portion 32 can be provided for the next molding while being uncured after the molding, by setting the orthogonal runner portion 32 to the cold runner. Therefore, from this point of view, the second mold 12 and the first mold 11 provided with the orthogonal runner portion 32 and the sprue 21 are set to the cold runner mold, and a heat insulation portion shutting off heating force is provided between the second mold 12 and the third mold 13 corresponding to a hot runner mold, or an opening and closing shutting off a continuous state of the molding material is provided between the second mold 12 and the third mold 13 in the parallel runner portion 33.

Further, since the metal mold 1 is not provided with the sprue and the runner in the inner peripheral side of a plurality of product cavity spaces as shown in FIGS. 3 and 4, the molded article 101 can be molded in a state in which the plate-like insert part is set, as described in detail in a fifth embodiment mentioned later. Therefore, from this point of view, the metal mold 1 is set to the metal mold which can execute the insert molding. As a result, a space portion for setting the insert part is provided in the parting portion of each of the split molds.

Third Embodiment

Figure 5:
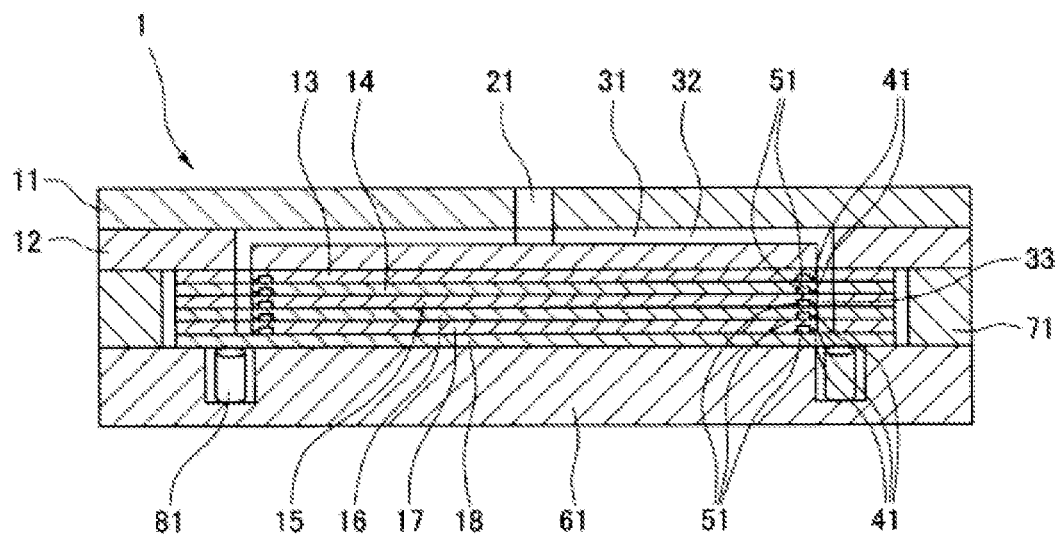
FIG. 5 is a cross sectional view showing a mold clamping state of a metal mold which is used for execution of a molding method according to a third embodiment of the present invention.
Figure 6:
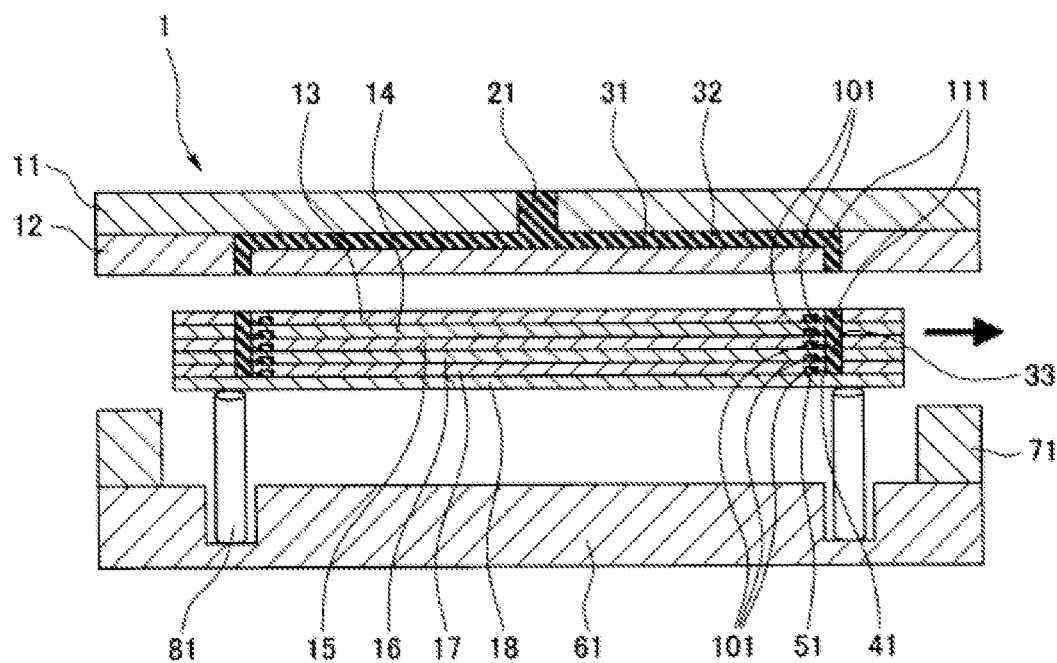
FIG. 6 is a cross sectional view showing a mold opening state of the metal mold.

FIGS. 5 and 6 show a cross section of a metal mold 1 which is used for execution of a molding method according to a third embodiment of the present invention. The metal mold 1 is a metal mold for an injection molding, and is structured such that a plurality of (five in the embodiment) product cavity spaces 51 having the same shape and same size are provided side by side at predetermined intervals in a mold clamping and mold opening direction (a vertical direction in the drawing) of the metal mold 1, and a plurality of (five in the embodiment) molded articles 101 having the same shape and same size can be simultaneously molded by using the metal mold 1. Further, the metal mold 1 is provided with first to eighth split molds 11 to 18 which are laminated and arranged in the mold clamping and mold opening direction of the metal mold 1, and product cavity spaces 51 are provided respectively in parting portions of the third mold 13 and the fourth mold 14, parting portions of the fourth mold 14 and the fifth mold 15, parting portions of the fifth mold 15 and the sixth mold 16, parting portions of the sixth mold 16 and the seventh mold 17 and parting portions of the seventh mold 17 and the eighth mold 18, except the first mold 11 and the second mold 12 which are provided with a sprue 21 and an orthogonal runner portion 32 among eight split molds 11 to 18. Since the metal mold 1 is supposed to take out a plurality of gaskets for fuel battery which are constructed by a liquid rubber formed into a rectangular frame-like plane, each of a plurality of product cavity spaces 51 is formed into a rectangular frame-like plane.

Further, each of the third to eighth molds 13 to 18 having the product cavity spaces 51 is set to a thin piece die type split mold (mold plate) as shown, and a lower mold 61 and a block mold 71 for collecting the piece dies and embedding in the metal mold 1 are provided. Further, an upthrowing device 81 constructed by a hydraulic cylinder for collecting and upthrowing the piece dies and transferring to the next step is embedded in the lower mold 61.

Since the metal mold 1 is supposed to take out a plurality of gaskets for fuel battery constructed by the liquid rubber which is formed into the rectangular frame-like plane, each of a plurality of product cavity spaces 51 is formed into a rectangular frame-like plane.

Further, the metal mold 1 is provided with a sprue 21, a runner 31 and gates 41 which are communicated with a plurality of product cavity spaces 51.

The sprue 21 is open so as to touch with nozzle at the center of a plane of the first mold 11, and is provided from here to the second mold 12 just below the sprue toward one direction (a lower direction in the drawing) of the mold clamping and mold opening direction of the metal mold 1.

The runner 31 is provided with an orthogonal runner portion 32 extended toward a direction (a lateral direction in the drawing) which is orthogonal to the mold clamping and mold opening direction of the metal mold 1 from the sprue 21, and a parallel runner portion 33 extended toward one side in a direction which is parallel to the mold clamping and mold opening direction of the metal mold 1 from a leading end of the orthogonal runner portion 32. The orthogonal runner portion 32 is provided in an upper surface of the second mold 12 having the sprue 21. The parallel runner portion 33 is arranged in an outer peripheral side of a plurality of product cavity spaces 51, is provided so as to pass through from the leading end of the orthogonal runner portion 32 to the seventh mold 17 having the product cavity space 51 at the lowest stage toward one side in the direction which is parallel to the mold clamping and mold opening direction of the metal mold 1, and is communicated with each of the product cavity spaces 51 via the gate 41 provided in each of the third to seventh molds 13 to 17. Since the product cavity space 51 is formed into the rectangular frame-like plane and the sprue 21 is arranged at the center of the plane of the metal mold 1 as mentioned above, and the parallel runner portion 33 is arranged in an outer peripheral side of the product cavity spaces 51, the orthogonal runner portion 32 is provided radially from the sprue 21. For example, four orthogonal runner portions 32 are provided radially toward four corners of the product cavity space 51 (four corners of the rectangular plane), and the parallel runner portion 33 is provided from each of leading ends thereof toward one side in the mold clamping and mold opening direction of the metal mold 1. As a result, according to the structure, four parallel runner portions 33 are provided in relation to five product cavity spaces 51, and the gates 41 at four positions are provided in one product cavity space 51. Further, the gate 41 is provided in a lower surface of each of the third to seventh molds 13 to 17 which are provided with the product cavity spaces 51 in their lower surfaces.

After, a plurality of molded articles 101 are simultaneously molded by using the metal mold 1 having the structure mentioned above, each of the third to eighth molds 13 to 18 constructed by the piece dies is collected and upthrown by the upthrowing device 81 as shown in FIG. 6, and is transferred to the next step (an arrow in the drawing).

The first mold 11 and the second mold 12 provided with the sprue 21 and the orthogonal runner portion 33 may be set to the cold runner mold as mentioned in the compliment of the second embodiment mentioned above.

Fourth Embodiment

In the molding method and the metal mold 1 according to the third embodiment mentioned above, the parallel runner portion 33 extended toward the direction which is parallel to the mold clamping and mold opening direction of the metal mold is formed into the straight cylindrical shape in which the opening cross sectional area is fixed over the entire length thereof. However, in this shape mentioned above, it may be hard to mold release the material (the burr) which is thermally cured in the parallel runner portion 33 or open and close the split molds after the molding, as mentioned above.

Figure 7:
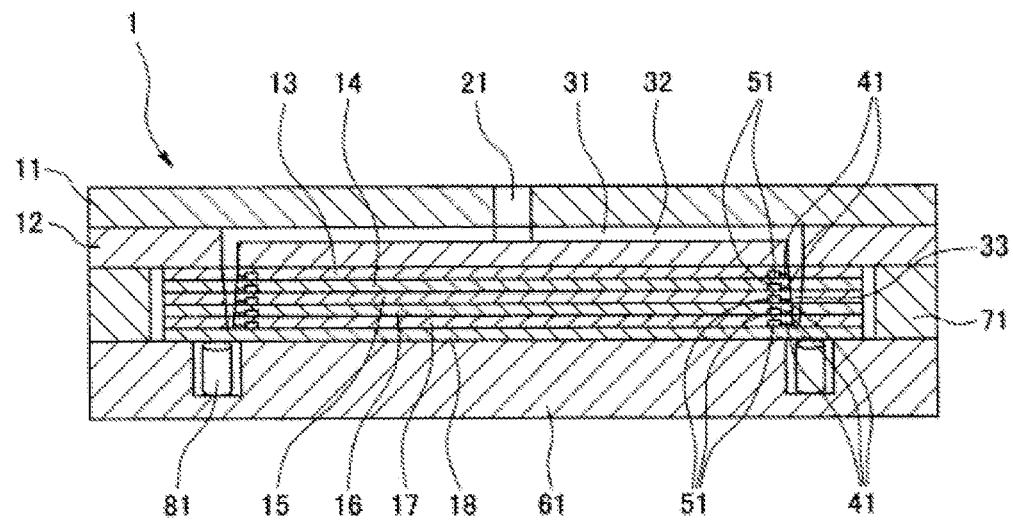
FIG. 7 is a cross sectional view showing a mold clamping state of a metal mold which is used for execution of a molding method according to a fourth embodiment of the present invention.
Figure 8:
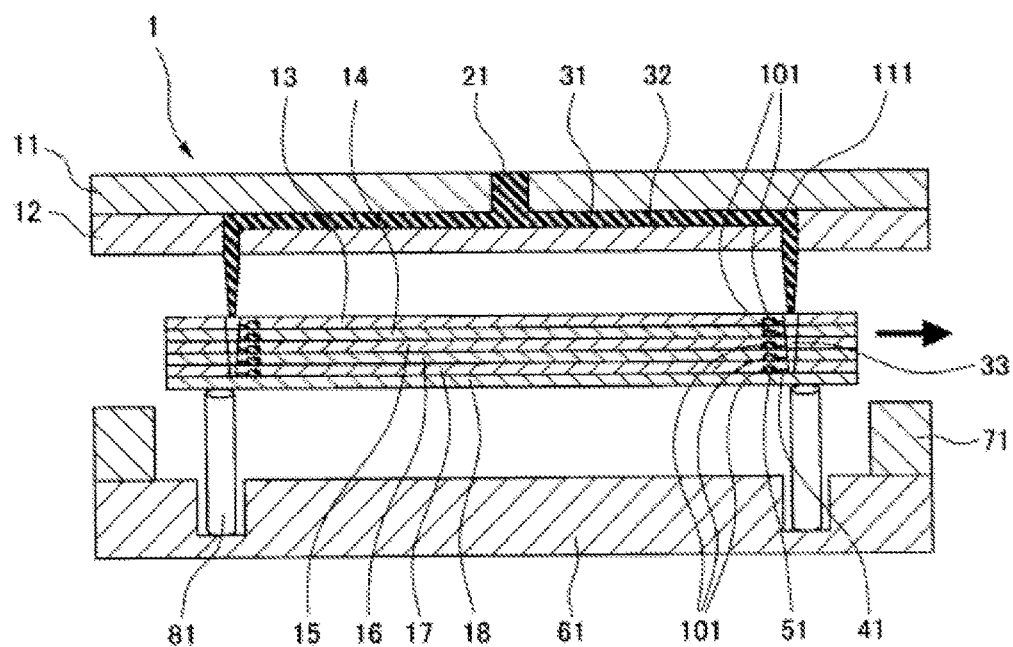
FIG. 8 is a cross sectional view showing a mold opening state of the metal mold.

Consequently, in order to devise a countermeasure, the fourth embodiment is structured, as shown in FIGS. 7 and 8, such that the opening cross sectional area of the parallel runner portion 33 is reduced little by little from an upstream side (an upper side of the drawing) of the molding material flow toward a downstream side (a lower side of the drawing) over the entire length between the third to eighth molds 13 to 18 constructed by the piece die. Therefore, according to the structure, since the inner peripheral surface of the parallel runner portion 33 and the outer peripheral surface of the burr 111 are both formed into a taper shape, it is easy to mold release the burr 111 or it is easy to open and close the split molds 13 to 18.

The other structures and operations and effects according to the fourth embodiment are the same as those of the third embodiment mentioned above. Therefore, a description thereof will be omitted by attaching the same reference numerals of FIGS. 5 and 6 to FIGS. 7 and 8.

Fifth Embodiment

Figure 9:
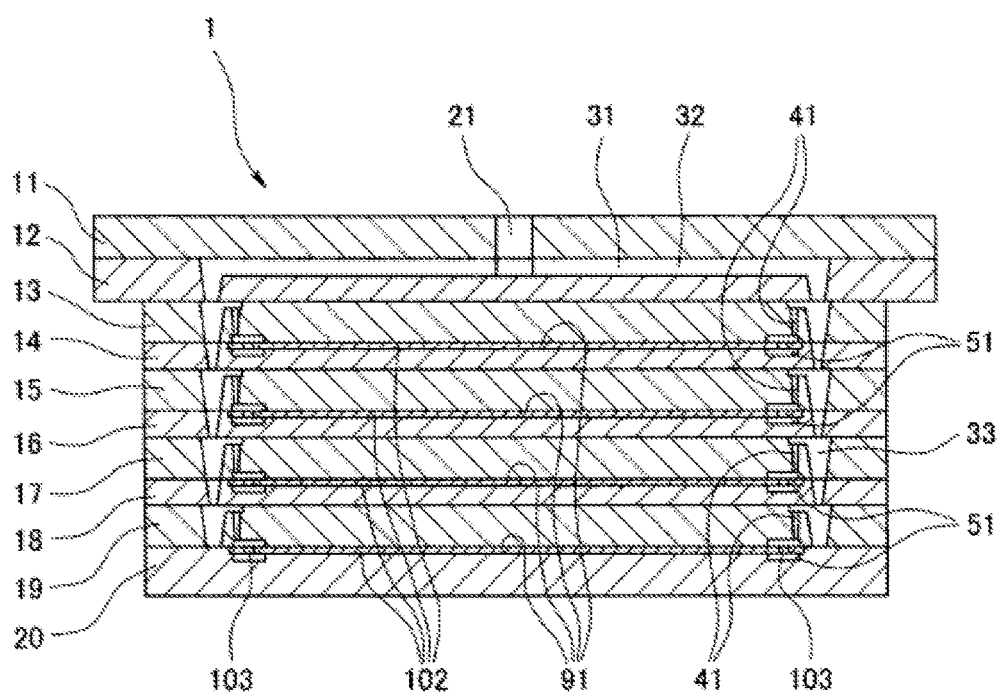
FIG. 9 is a cross sectional view showing a mold clamping state of a metal mold which is used for execution of a molding method according to a fifth embodiment of the present invention.
Figure 10:
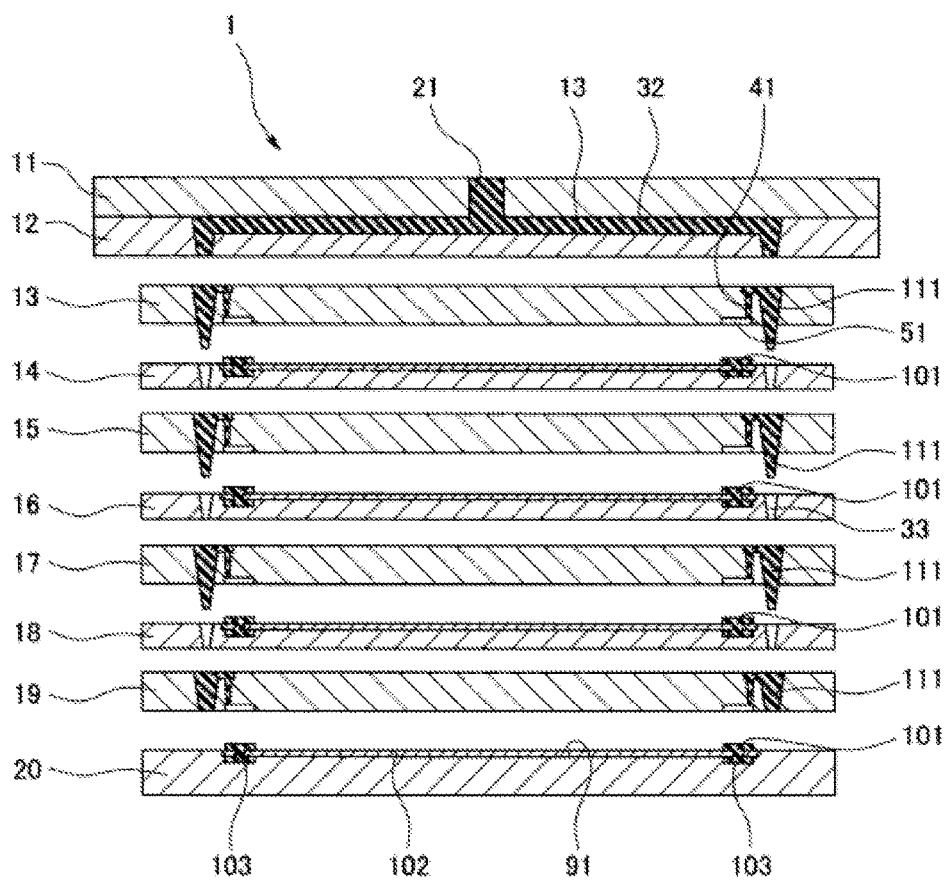
FIG. 10 is a cross sectional view showing a mold opening state of the metal mold.

FIGS. 9 and 10 show a cross section of a metal mold 1 which is used for execution of a molding method according to a fifth embodiment of the present invention. The metal mold 1 is a metal mold for an injection molding, and is structured such that a plurality of (four in the embodiment) product cavity spaces 51 having the same shape and same size are provided side by side at predetermined intervals in a mold clamping and mold opening direction (a vertical direction in the drawing) of the metal mold 1, and a plurality of (four in the embodiment) molded articles 101 having the same shape and same size can be simultaneously molded by using the metal mold 1. Further, the metal mold 1 is provided with first to tenth split molds 11 to 20 which are laminated and arranged in the mold clamping and mold opening direction of the metal mold 1, and product cavity spaces 51 are provided respectively in parting portions of the third mold 13 and the fourth mold 14, parting portions of the fifth mold 15 and the sixth mold 16, parting portions of the seventh mold 17 and the eighth mold 18 and parting portions of the ninth mold 19 and the tenth mold 20, except the first mold 11 and the second mold 12 provided with a sprue 21 and an orthogonal runner portion 32.

Since the metal mold 1 is supposed to take out a plurality of gaskets for fuel battery constructed by the liquid rubber which is formed into the rectangular frame-like plane, each of a plurality of product cavity spaces 51 is formed into a rectangular frame-like plane.

Further, since the metal mold 1 is supposed to integrally mold the gasket in a state in which a plate-like insert part 102 is set, space portions 91 for setting the insert part 102 are provided respectively in the parting portions of the third mold 13 and the fourth mold 14, the parting portions of the fifth mold 15 and the sixth mold 16, the parting portions of the seventh mold 17 and the eighth mold 18 and the parting portions of the ninth mold 19 and the tenth mold 20. Further, since the metal mold 1 is supposed to integrally mold the gasket on both surfaces in a thickness direction of the plate-like insert part 102, the metal mold 1 is provided with a through hole 103 for circulating the molding material in the insert part 102.

Further, the metal mold 1 is provided with a sprue 21, a runner 31 and gates 41 which are communicated with a plurality of product cavity spaces 51.

The sprue 21 is open so as to touch with nozzle at the center of a plane of the first mold 11, and is provided from here to the second mold 12 just below the sprue toward one direction (a lower direction in the drawing) of the mold clamping and mold opening direction of the metal mold 1.

The runner 31 is provided with an orthogonal runner portion 32 extended toward a direction (a lateral direction in the drawing) which is orthogonal to the mold clamping and mold opening direction of the metal mold 1 from the sprue 21, and a parallel runner portion 33 extended toward one side in a direction which is parallel to the mold clamping and mold opening direction of the metal mold 1 from a leading end of the orthogonal runner portion 32. The orthogonal runner portion 32 is provided in an upper surface of the second mold 12 having the sprue 21. The parallel runner portion 33 is arranged in an outer peripheral side of a plurality of product cavity spaces 51, is provided so as to pass through from the leading end of the orthogonal runner portion 32 to the ninth mold 19 having the product cavity space 51 at the lowest stage toward one side in the direction which is parallel to the mold clamping and mold opening direction of the metal mold 1, and is communicated with each of the product cavity spaces 51 via the gates 41 provided in the third 13, the fifth mold 15, the seventh mold 17 and the ninth mold 19. Since the product cavity space 51 is formed into the rectangular frame-like plane and the sprue 21 is arranged at the center of the plane of the metal mold 1 as mentioned above, and the parallel runner portion 33 is arranged in an outer peripheral side of the product cavity spaces 51, the orthogonal runner portion 32 is provided radially from the sprue 21. For example, four orthogonal runner portions 32 are provided radially toward four corners of the product cavity space 51 (four corners of the rectangular plane), and the parallel runner portion 33 is provided from each of leading ends thereof toward one side in the mold clamping and mold opening direction of the metal mold 1. As a result, according to the structure, four parallel runner portions 33 are provided in relation to four product cavity spaces 51, and the gates 41 at four positions are provided in one product cavity space 51. Further, the gates 41 are provided in the upper surfaces of the third mold 13, the fifth mold 15, the seventh mold 17 and the ninth mold 19 which are provided with the product cavity spaces 51 in their lower surfaces.

Further, the parallel runner portions 33 are structured such that the opening cross sectional areas are reduced little by little from the upstream side (the upper side of the drawing) of the molding material flow toward the downstream side (the lower side of the drawing), every split molds defining a plurality of product cavity spaces 51, that is, respectively from the third mold 13 defining the product cavity space 51 in the highest stage to the fourth mold 14, from the fifth mold 15 defining the product cavity space 51 in the second stage to the sixth mold 16, and from the seventh mold 17 defining the product cavity space 51 in the third stage to the eighth mold 18. Therefore, according to the structure mentioned above, since the inner peripheral surface of the parallel runner portion 33 and the outer peripheral surface of the burr 111 are both formed into the taper shape, it is easy to mold release the burr 111 or open and close the split molds.

In the case that a plurality of molded articles 101 are simultaneously molded by using the metal mold 1 having the structure mentioned above and the molds are opened, the molded articles 101 are retained by the fourth mold 14, the sixth mold 16, the eighth mold 18 and the tenth mold 20, and the burrs 111 are retained by the third mold 13, the fifth mold 15, the seventh mold 17 and the ninth mold 19, as shown in FIG. 10.

The first mold 11 and the second mold 12 having the sprue 21 and the orthogonal runner portion 32 may be structured as the cold runner mold as mentioned in the complement of the second embodiment mentioned above.

What is claimed is:

1. A molding method of a liquid elastomer for molding a molded article constructed by the liquid elastomer by using a metal mold,
    wherein said metal mold is a metal mold for an injection molding, a plurality of product cavity spaces are provided side by side in a mold clamping and mold opening direction of said metal mold,
    wherein said metal mold is provided with a sprue, runners and gates which are communicated with said plurality of product cavity spaces,
    wherein said runners are provided with orthogonal runner portions extended in a direction which is orthogonal to the molding clamping and mold opening direction of said metal from said sprue, and parallel runner portions extended in a direction which is parallel to the mold clamping and mold opening direction of said metal mold from said orthogonal runner portions,
    wherein said parallel runner portions are arranged in an outer peripheral side of said plurality of product cavity spaces, and
    wherein a plurality of molded articles are simultaneously molded by using said metal mold.

2. The molding method of the liquid elastomer according to claim 1, wherein a split mold defining said orthogonal runner portions in said metal mold is set to a non-heated runner mold.

3. The molding method of the liquid elastomer according to claim 1, wherein said metal mold is structured such as to mold the molded article in a state in which an insert part is set, and said molded article is integrally molded in relation to said insert part.

4. The molding method of the liquid elastomer according to claim 1 wherein said parallel runner portion is structured such that an opening cross sectional area thereof narrows from an upstream side of a molding material flow toward a downstream side, over the entire length thereof or every split molds defining said plurality of product cavity spaces.

5. The molding method of the liquid elastomer according to claim 1 wherein said molded article is a gasket for a fuel battery.

6. The molding method of the liquid elastomer according to claim 2, wherein said metal mold is structured such as to mold the molded article in a state in which an insert part is set, and said molded article is integrally molded in relation to said insert part.

7. The molding method of the liquid elastomer according to claim 2, wherein said parallel runner portion is structured such that an opening cross sectional area thereof narrows from an upstream side of a molding material flow toward a downstream side, over the entire length thereof or every split molds defining said plurality of product cavity spaces.

8. The molding method of the liquid elastomer according to claim 3, wherein said parallel runner portion is structured such that an opening cross sectional area thereof narrows from an upstream side of a molding material flow toward a downstream side, over the entire length thereof or every split molds defining said plurality of product cavity spaces.

9. The molding method of the liquid elastomer according to claim 6, wherein said parallel runner portion is structured such that an opening cross sectional area thereof is reduced little by little from an upstream side of a molding material flow toward a downstream side, over the entire length thereof or every split molds defining said plurality of product cavity spaces.

10. The molding method of the liquid elastomer according to claim 1, wherein said molded article is a gasket for a fuel battery.

11. The molding method of the liquid elastomer according to claim 2, wherein said molded article is a gasket for a fuel battery.

12. The molding method of the liquid elastomer according to claim 3, wherein said molded article is a gasket for a fuel battery.

13. The molding method of the liquid elastomer according to claim 4, wherein said molded article is a gasket for a fuel battery.

14. The molding method of the liquid elastomer according to claim 6, wherein said molded article is a gasket for a fuel battery.

15. The molding method of the liquid elastomer according to claim 7, wherein said molded article is a gasket for a fuel battery.

16. The molding method of the liquid elastomer according to claim 8, wherein said molded article is a gasket for a fuel battery.

17. The molding method of the liquid elastomer according to claim 9, wherein said molded article is a gasket for a fuel battery.

* * * * *